US009013508B2

(12) United States Patent
Liang et al.

(10) Patent No.: US 9,013,508 B2
(45) Date of Patent: Apr. 21, 2015

(54) METHOD AND TERMINAL DEVICE FOR FILTERING OBJECTS

(71) Applicant: Huawei Technologies Co., Ltd., Shenzhen (CN)

(72) Inventors: Jun Liang, Shenzhen (CN); Jian Gao, Shenzhen (CN); Gang Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/019,919

(22) Filed: Sep. 6, 2013

(65) Prior Publication Data
US 2014/0002501 A1 Jan. 2, 2014

Related U.S. Application Data

(63) Continuation of application No. PCT/CN2012/073229, filed on Mar. 29, 2012.

(51) Int. Cl.
G09G 5/00 (2006.01)
G06T 11/00 (2006.01)
G06F 17/30 (2006.01)

(52) U.S. Cl.
CPC ........ G06T 11/001 (2013.01); G06F 17/30572 (2013.01)

(58) Field of Classification Search
CPC ................ G06F 7/00; G06F 17/30392; G06F 17/30867; G06F 17/30241; G06F 17/30554; G06F 17/30699; G06F 17/30828; G06F 21/6218; G06F 3/016; G06F 3/04842; G08B 13/19682; G06T 2207/20021; G06T 2200/24; G06T 7/2026

USPC .......................................... 345/642, 440, 418
See application file for complete search history.

(56) References Cited

U.S. PATENT DOCUMENTS

| 6,507,836 | B1 * | 1/2003 | Nose et al. ............................. 1/1 |
| 2004/0267736 | A1 | 12/2004 | Yamane et al. |
| 2006/0202994 | A1 | 9/2006 | Chevallier et al. |
| 2009/0187849 | A1 * | 7/2009 | Rhee et al. .................... 715/781 |
| 2009/0300004 | A1 | 12/2009 | Tokashiki et al. |

(Continued)

FOREIGN PATENT DOCUMENTS

CN 1836230 A 9/2006
CN 101211249 A 7/2008

(Continued)

OTHER PUBLICATIONS

International Search Report and Written Opinion of the International Searching Authority mailed Jan. 10, 2013 in corresponding International Application No. PCT/CN2012/073229.

(Continued)

Primary Examiner — Ke Xiao
Assistant Examiner — Kim-Thanh T Tran
(74) Attorney, Agent, or Firm — Staas & Halsey LLP

(57) ABSTRACT

Embodiments provide a method and a terminal device for filtering objects. By using the technical solutions provided by the embodiments, the terminal device can display filtered objects, and problems in the prior art that a long time is needed to retrieve subsequent objects and that errors easily occur if the terminal device needs to display a lot of objects can be avoided, thereby effectively increasing the efficiency and reliability of displaying objects.

11 Claims, 3 Drawing Sheets

(56) References Cited

U.S. PATENT DOCUMENTS

| | | | |
|---|---|---|---|
| 2010/0053168 A1* | 3/2010 | Kemp et al. | 345/440 |
| 2011/0077850 A1 | 3/2011 | Ushida | |
| 2011/0298825 A1* | 12/2011 | Wanda et al. | 345/633 |

FOREIGN PATENT DOCUMENTS

| | | |
|---|---|---|
| CN | 101593212 A | 12/2009 |
| CN | 101661503 A | 3/2010 |
| CN | 102012783 A | 4/2011 |
| CN | 102032908 A | 4/2011 |
| CN | 102236647 A | 11/2011 |

OTHER PUBLICATIONS

Chinese Office Action mailed Aug. 22, 2013 in corresponding Chinese Application No. 201280000464.1.

International Search Report mailed Jan. 10, 2013 in corresponding International Application No. PCT/CN2012/073229.

\* cited by examiner

METHOD AND TERMINAL DEVICE FOR FILTERING OBJECTS

CROSS-REFERENCE TO RELATED APPLICATIONS

This application is a continuation of International Application No. PCT/CN2012/073229, filed on Mar. 29, 2012, which is hereby incorporated by reference in its entirety.

FIELD OF THE INVENTION

The present embodiments relate to information processing technologies, and in particular, to a method and a terminal device for filtering objects.

BACKGROUND OF THE INVENTION

With the development of communication technologies, a terminal device integrates more and more functions, so that the terminal device needs to manage more and more objects. In a process of managing objects, the terminal device may display, according to a received operation instruction, all objects in a directory corresponding to the operation instruction in a preset format.

However, if the terminal device needs to display a lot of objects, it may take a long time to retrieve subsequent objects, which reduces the efficiency and reliability of displaying objects.

SUMMARY OF THE INVENTION

Embodiments of the present invention provide a method and a terminal device for filtering objects to increase the efficiency and reliability of displaying objects.

In one aspect, a method for filtering objects is provided, including:

moving a filter block according to a received instruction for moving the filter block, and obtaining a first coordinate value of a first axis and a second coordinate value of a second axis corresponding to a center position of the filter block according to a position of the filter block, where the filter block is displayed in a plane coordinate system formed by the first axis and the second axis, where the coordinate value on the first axis and the coordinate value on the second axis correspond to an object attribute parameter respectively;

obtaining a filter condition according to the object attribute parameter corresponding to the first coordinate value and the object attribute parameter corresponding to the second coordinate value; and displaying an object whose object attribute parameter meets the filter condition in the plane coordinate system formed by the first axis and the second axis.

In another aspect, a terminal device is provided, including:

a coordinate obtaining unit, configured to move a filter block according to a received instruction for moving the filter block, and obtain a first coordinate value of a first axis and a second coordinate value of a second axis corresponding to a center position of the filter block according to a position of the filter block, where the filter block is displayed in a plane coordinate system formed by the first axis and the second axis, where the coordinate value on the first axis and the coordinate value on the second axis correspond to an object attribute parameter respectively;

a condition obtaining unit, configured to obtain a filter condition according to the object attribute parameter corresponding to the first coordinate value and the object attribute parameter corresponding to the second coordinate value; and an object displaying unit, configured to display an object whose object attribute parameter meets the filter condition in the plane coordinate system formed by the first axis and the second axis.

According to the foregoing technical solutions, in the embodiments of the present invention, the filter block is moved according to the received instruction for moving the filter block; the first coordinate value of the first axis and the second coordinate value of the second axis corresponding to the center position of the filter block are obtained according to the position of the filter block, where the filter block is displayed in the plane coordinate system formed by the first axis and the second axis; further, the filter condition is obtained according to the object attribute parameter corresponding to the first coordinate value and the object attribute parameter corresponding to the second coordinate value, so that the object whose object attribute parameter meets the foregoing filter condition can be displayed in the plane coordinate system formed by the first axis and the second axis. By using the technical solutions provided by the embodiments of the present invention, the terminal device can display filtered objects, and problems in the prior art that a long time is needed to retrieve subsequent objects and that errors easily occur if the terminal device needs to display a lot of objects can be avoided, thereby effectively increasing the efficiency and reliability of displaying objects.

BRIEF DESCRIPTION OF THE DRAWINGS

To illustrate the technical solutions in the embodiments of the present invention or in the prior art more clearly, the accompanying drawings required for describing the embodiments are briefly described in the following. Apparently, the accompanying drawings in the following description show some embodiments of the present invention, and persons of ordinary skill in the art may still derive other drawings from these accompanying drawings without creative efforts.

DETAILED DESCRIPTION OF THE EMBODIMENTS

To make the objectives, technical solutions, and advantages of the embodiments of the present invention more comprehensible, the technical solutions in the embodiments of the present invention are clearly described in the following with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

It should be noted that the terminal device involved in the embodiments of the present invention includes but is not limited to a handset, an MP3 player, an MP4 player, a personal digital assistant (Personal Digital Assistant, PDA), a wireless handheld device, a personal computer, a television set, and the like.

Figure 1:
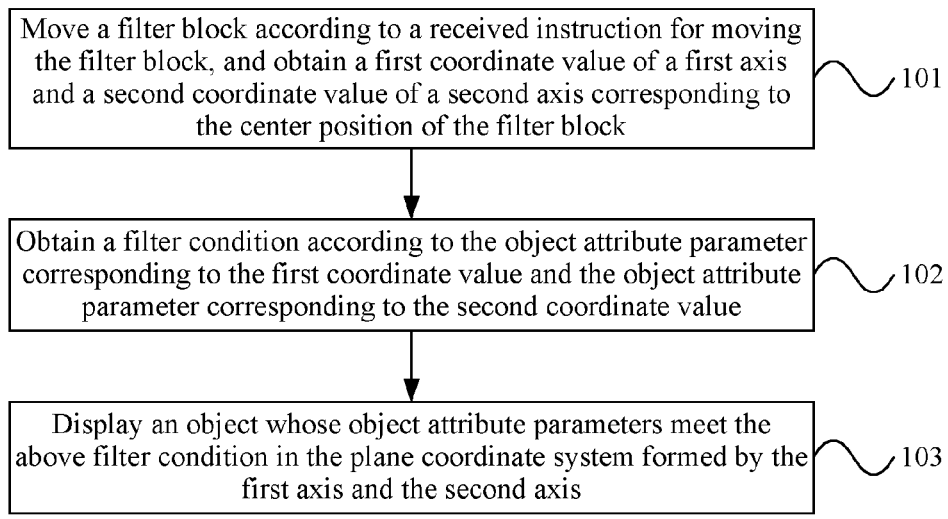
FIG. 1 is a schematic flowchart of a method for filtering objects according to an embodiment of the present invention.

FIG. 1 is a schematic flowchart of a method for filtering objects according to an embodiment of the present invention. As shown in FIG. 1, the method for filtering objects in this embodiment may include the following:

101. Move a filter block according to a received instruction for moving the filter block, and obtain a first coordinate value of a first axis and a second coordinate value of a second axis corresponding to the center position of the filter block according to the position of the filter block.

Figure 2:
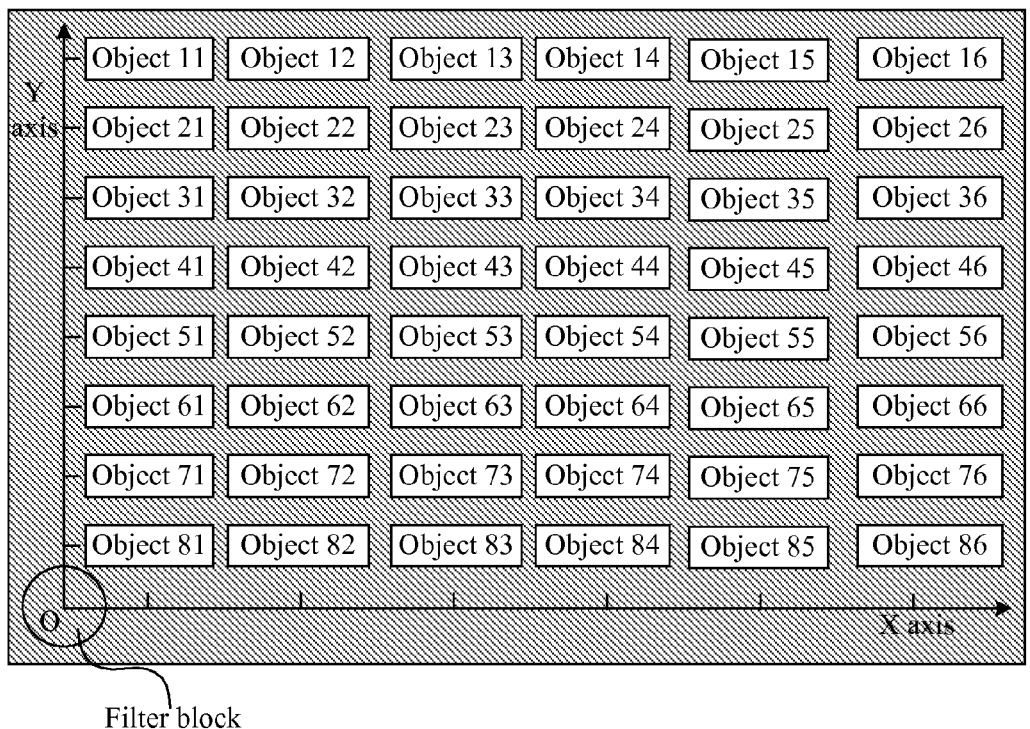
FIG. 2 is a schematic diagram of displaying objects in the embodiment corresponding to FIG. 1.

The foregoing filter block is displayed in a plane coordinate system formed by the first axis and the second axis; the coordinate value on the first axis and the coordinate value on the second axis correspond to an object attribute parameter respectively, as shown in FIG. 2.

The filter block may be designed in any shape, for example, a circle, a triangle, a rectangle, a square, a parallelogram, or a trapezium, which is not limited in this embodiment.

In an alternative implementation manner of this embodiment, in 101, the filter block may be displayed, by using a preset second transparency parameter, in a plane coordinate system formed by the first axis and the second axis.

In an alternative implementation manner of this embodiment, the plane coordinate system formed by the first axis and the second axis may be a rectangular coordinate system, whose origin may be located at a position such as the lower left corner or lower right corner of the display screen, which is not limited in this embodiment.

In an alternative implementation manner of this embodiment, the plane coordinate system formed by the first axis and the second axis may be a polar coordinate system, whose origin may be located at a position such as the lower left corner or lower right corner of the display screen, which is not limited in this embodiment.

102. Obtain a filter condition according to the object attribute parameters corresponding to the first coordinate value and the object attribute parameter corresponding to the second coordinate value.

In an alternative implementation manner of this embodiment, a filter condition (X1, Y1) is obtained according to an object attribute parameter X1 corresponding to the first coordinate value and an object attribute parameter Y1 corresponding to the second coordinate value. Specifically, the foregoing filter condition may be an object whose object attribute parameter X is equal to X1 and whose object attribute parameter Y is equal to Y1; or further be an object whose object attribute parameter X is smaller than X1 and whose object attribute parameter Y is greater than Y1; or further be an object whose object attribute parameter X is smaller than X1 and whose object attribute parameter Y is smaller than Y1; or further be an object whose object attribute parameter X is greater than X1 and whose object attribute parameter Y is smaller than Y1, which is not limited in this embodiment.

103. Display an object whose object attribute parameter meets the foregoing filter condition in the plane coordinate system formed by the first axis and the second axis.

The executive body of the foregoing 101 to 103 may be a terminal device.

In an alternative implementation manner of this embodiment, in 102, the terminal device may display, according to at least one of an object access status, a preset object access priority level, and a degree of matching between the object attribute parameter and the filter condition, an object whose object attribute parameter meets the filter condition around the filter block.

Alternatively, one case is that the terminal device may display, according to the object access status, objects whose object attribute parameters meet the foregoing filter condition from near to far around the filter block. For example, objects that are frequently accessed are displayed at areas close to the filter block, while objects that are seldom accessed are displayed at areas far away from the filter block.

Alternatively, another case is that the terminal device may display, according to the preset object access priority level, objects whose object attribute parameters meet the foregoing filter condition from near to far around the filter block. For example, objects with a high access priority level are displayed at areas close to the filter block, while objects with a low access priority level are displayed at areas far away from the filter block.

Alternatively, another case is that the terminal device may display, according to the degree of matching between the object attribute parameter and the filter condition, objects whose object attribute parameters meet the foregoing filter condition from near to far around the filter block. For example, objects whose object attribute parameters match the foregoing filter condition at a high degree are displayed at areas close to the filter block, while objects whose object attribute parameters match the foregoing filter condition at a low degree are displayed at areas far away from the filter block. For example, the closer the object attribute parameter is to the filter condition, the higher the matching degree is. For example, if the filter condition is that the date of creation is March 26 or later and that the file size is smaller than or equal to 5 M, objects whose date of creation is March 26 and whose file size is 5 M are matched at the highest degree.

Solutions of any combination of two cases among the foregoing three cases or a combination of the foregoing three cases may be combined by referring to the foregoing cases, which are not further described herein.

Specifically, multiple modes are available for displaying objects whose object attribute parameters meet the foregoing filter condition around the filter block, which are not specifically limited in this embodiment.

Figure 3:
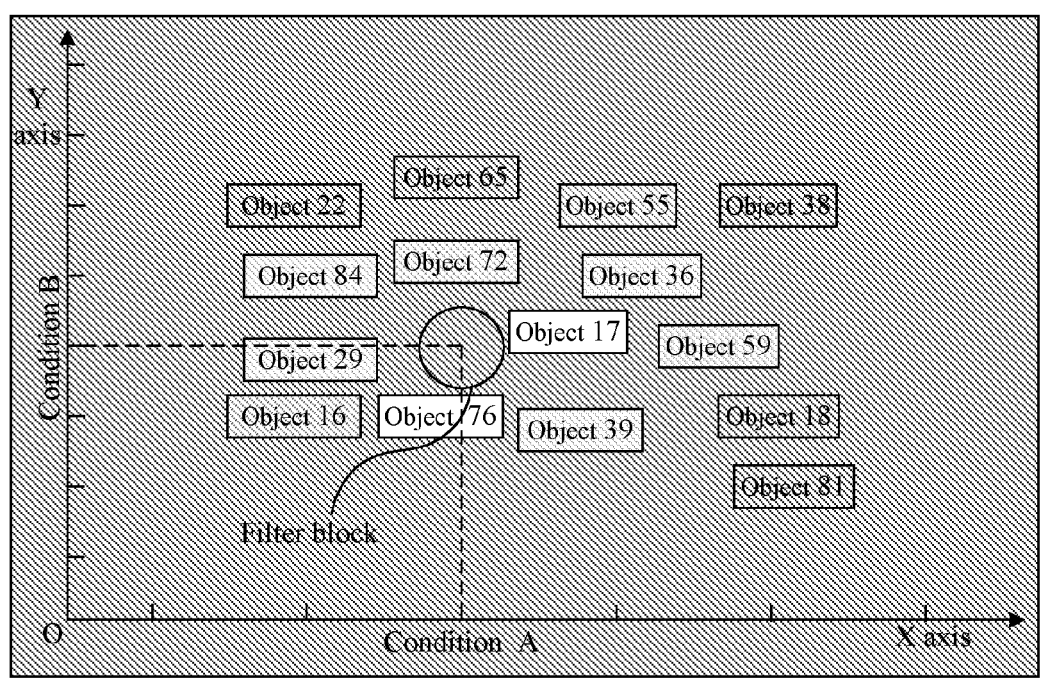
FIG. 3 is another schematic diagram of displaying objects in the embodiment corresponding to FIG. 1.

For example, the terminal device may specifically display, by using a preset first transparency parameter, an object whose object attribute parameter meets the filter condition around the filter block. The shorter the distance between the object and the filter block is, the smaller the first transparency parameter of the object is, as shown in FIG. 3.

Figure 4:
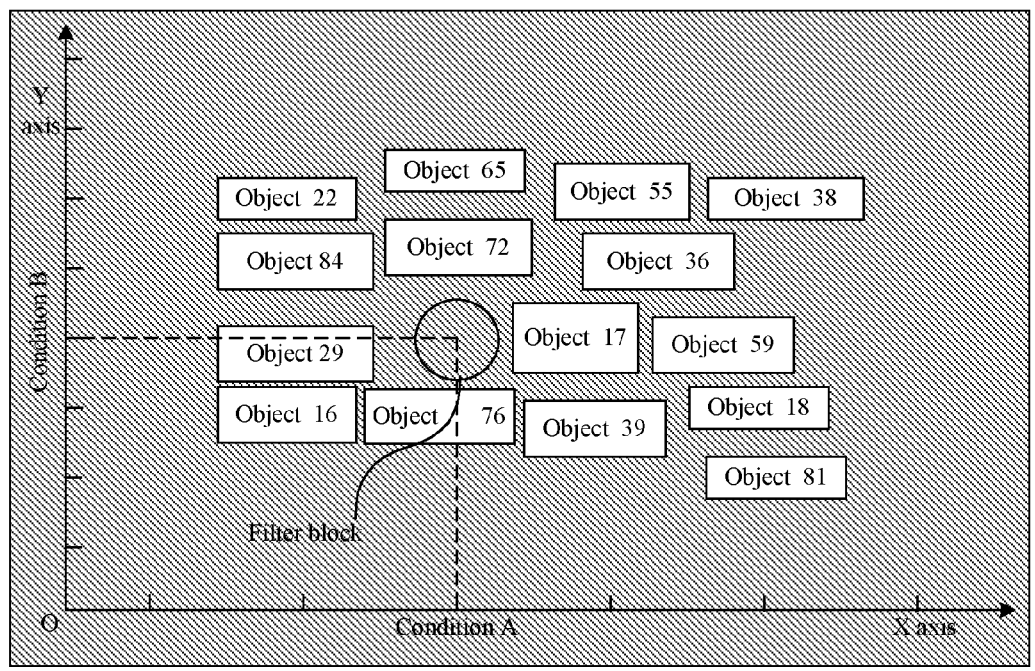
FIG. 4 is a schematic diagram of displaying objects in the embodiment corresponding to FIG. 1.

In another example, the terminal device may further specifically display, by using a preset object size parameter, an object whose object attribute parameter meets the filter condition around the filter block. The shorter the distance between the object and the filter block is, the larger the object size parameter of the object is, as shown in FIG. 4.

In this embodiment, a filter block is moved according to the received instruction for moving the filter block; the first coordinate value of the first axis and the second coordinate value of the second axis corresponding to the center position of the filter block are obtained according to the position of the filter block, where the filter block is displayed in the plane coordinate system formed by the first axis and the second axis; further, the filter condition is obtained according to the object attribute parameter corresponding to the first coordinate value and the object attribute parameter corresponding to the second coordinate value, so that the object whose object attribute parameter meets the foregoing filter condition can be displayed in the plane coordinate system formed by the first axis and the second axis. By using the technical solution provided by this embodiment of the present invention, the terminal device can display filtered objects, and problems in the prior art that a long time is needed to retrieve subsequent objects and that errors easily occur if the terminal device needs to display a lot of objects can be avoided, thereby effectively increasing the efficiency and reliability of displaying objects.

It should be noted that, for brevity, the foregoing method embodiment is represented as a series of actions. But persons skilled in the art should understand that the present invention is not limited to the order of the described actions, because according to the present invention, some steps may adopt other orders or occur simultaneously. It should be further understood by persons skilled in the art that the described embodiment belongs to an exemplary embodiment, and the involved actions and modules are not necessarily required by the present invention.

Figure 5:
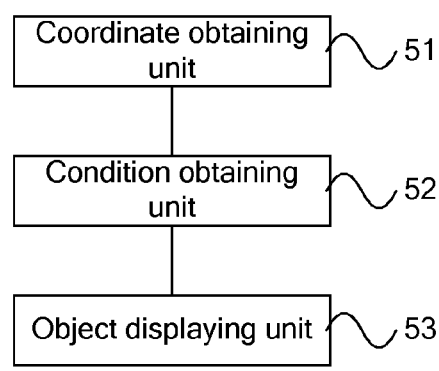
FIG. 5 is a schematic structural diagram of a terminal device according to another embodiment of the present invention.

FIG. 5 is a schematic structural diagram of a terminal device according to another embodiment of the present invention. As shown in FIG. 5, the terminal device provided in this embodiment may include a coordinate obtaining unit 51, a condition obtaining unit 52, and an object displaying unit 53. The coordinate obtaining unit 51 is configured to move a filter block according to a received instruction for moving the filter block, and obtain a first coordinate value of a first axis and a second coordinate value of a second axis corresponding to a center position of the filter block according to a position of the filter block, where the filter block is displayed in a plane coordinate system formed by the first axis and the second axis, where the coordinate value on the first axis and the coordinate value on the second axis correspond to an object attribute parameter respectively; the condition obtaining unit 52 is configured to obtain a filter condition according to the object attribute parameter corresponding to the first coordinate value and the object attribute parameter corresponding to the second coordinate value; and the object displaying unit 53 is configured to display an object whose object attribute parameter meets the filter condition in the plane coordinate system formed by the first axis and the second axis.

Details are disclosed in the embodiment corresponding to FIG. 1, and are not further provided herein.

The filter block may be designed in any shape, for example, a circle, a triangle, a rectangle, a square, a parallelogram, or a trapezium, which is not limited in this embodiment.

In an alternative implementation manner of this embodiment, the filter block may be displayed, by using a preset second transparency parameter, in the plane coordinate system formed by the first axis and the second axis.

In an alternative implementation of this embodiment, the plane coordinate system formed by the first axis and the second axis may be a rectangular coordinate system, whose origin may be located at a position such as the lower left corner or lower right corner of the display screen, which is not limited in this embodiment.

In an alternative implementation of this embodiment, the plane coordinate system formed by the first axis and the second axis may be a polar coordinate system, whose origin may be located at a position such as the lower left corner or lower right corner of the display screen, which is not limited in this embodiment.

In an alternative implementation of this embodiment, the object displaying unit 53 may specifically display, according to at least one of an object access status, a preset object access priority level, and a degree of matching between the object attribute parameter and the filter condition, an object whose object attribute parameter meets the filter condition around the filter block.

For example, the object displaying unit 53 may specifically display, by using a preset first transparency parameter, an object whose object attribute parameter meets the filter condition around the filter block. The shorter the distance between the object and the filter block is, the smaller the first transparency parameter of the object is, as shown in FIG. 3.

In another example, the object displaying unit 53 may specifically display, by using a preset object size parameter, an object whose object attribute parameter meets the filter condition around the filter block. The shorter the distance between the object and the filter block is, the larger the object size parameter of the object is, as shown in FIG. 4.

In this embodiment, in the terminal device, the coordinate obtaining unit moves the filter block according to the received instruction for moving the filter block, and obtains the first coordinate value of the first axis and the second coordinate value of the second axis corresponding to the center position of the filter block according to the position of the filter block, where the filter block is displayed in the plane coordinate system formed by the first axis and the second axis; further, the condition obtaining unit obtains the filter condition according to the object attribute parameter corresponding to the first coordinate value and the object attribute parameter corresponding to the second coordinate value, so that the object displaying unit can display, in the plane coordinate system formed by the first axis and the second axis, the object whose object attribute parameter meets the foregoing filter condition. By using the technical solution provided by this embodiment of the present invention, the terminal device can display filtered objects, and problems in the prior art that a long time is needed to retrieve subsequent objects and that errors easily occur if the terminal device needs to display a lot of objects can be avoided, thereby effectively increasing the efficiency and reliability of displaying objects.

Persons skilled in the art may clearly understand that, for the purpose of convenient and brief description, for a detailed working process of the system, apparatus, and unit described above, reference may be made to a corresponding process in the method embodiment, and details will not be described herein again.

In the embodiments provided in the present application, it should be understood that the disclosed system, apparatus, and method may be implemented in other modes. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit. The integrated unit may be implemented through hardware, or may also be implemented in a form of hardware plus a software functional module.

The integrated unit implemented in the form of the software functional unit may be stored in a computer readable storage medium. The software functional unit is stored in a storage medium, and includes several instructions used to instruct computer device (for example, a personal computer, a server, or a network device) to perform the steps of the methods according to the embodiment of the present invention. The storage medium includes: any medium that can store program codes, such as a USB flash disk, a removable hard disk, a read-only memory (ROM, Read-Only memory), a random access memory (RAM, Random Access Memory), a magnetic disk, or an optical disk.

Finally, it should be noted that the foregoing embodiments of the present invention are merely intended for describing the technical solutions of the present invention other than limiting the present invention. Although the present invention is described in detail with reference to the foregoing embodiments, persons of ordinary skill in the art should understand that they may still make modifications to the technical solution described in the foregoing embodiments or make equivalent replacements to some technical features thereof, without departing from the spirit and scope of the technical solutions of the embodiments of the present invention.

What is claimed is:

1. A method for filtering objects, comprising:
   moving a filter block according to a received instruction for moving the filter block, and obtaining a first coordinate value of a first axis and a second coordinate value of a second axis corresponding to a center position of the moved filter block, according to a position of the moved filter block, wherein the filter block is displayed in a plane coordinate system formed by the first axis and the second axis, wherein the coordinate value on the first axis and the coordinate value on the second axis each correspond to an object attribute parameter respectively;
   obtaining a filter condition according to the object attribute parameter corresponding to the first coordinate value and the object attribute parameter corresponding to the second coordinate value; and
   displaying an object stored in a directory of a computer and whose object attribute parameter meets the filter condition around the moved filter block in the plane coordinate system formed by the first axis and the second axis, by
      using a preset first transparency parameter, wherein the shorter the distance between the object and the moved filter block is, the smaller the first transparency parameter of the object is, or
      using a preset object size parameter, wherein the shorter the distance between the object and the moved filter block is, the larger the object size parameter of the object is,
      to thereby filter which objects stored in the directory will be displayed.

2. The method according to claim 1, wherein the displaying an object whose object attribute parameter meets the filter condition in the plane coordinate system formed by the first axis and the second axis specifically comprises:
   displaying, according to at least one of an object access status, a preset object access priority level, and a degree of matching between the object attribute parameter and the filter condition, an object whose object attribute parameter meets the filter condition around the moved filter block.

3. The method according to claim 1, wherein the plane coordinate system formed by the first axis and the second axis specifically comprises:
   a rectangular coordinate system or a polar coordinate system formed by the first axis and the second axis.

4. The method according to claim 1, wherein the filter block is displayed in a plane coordinate system formed by the first axis and the second axis by:
   displaying, by using a preset second transparency parameter, the filter block in the plane coordinate system formed by the first axis and the second axis.

5. A terminal device, comprising:
   a coordinate obtaining unit, configured to move a filter block according to a received instruction for moving the filter block, and obtain a first coordinate value of a first axis and a second coordinate value of a second axis corresponding to a center position of the moved filter block according to a position of the moved filter block, wherein the filter block is displayed in a plane coordinate system formed by the first axis and the second axis, wherein the coordinate value on the first axis and the coordinate value on the second axis correspond to an object attribute parameter respectively;
   a condition obtaining unit, configured to obtain a filter condition according to the object attribute parameter corresponding to the first coordinate value and the object attribute parameter corresponding to the second coordinate value; and
   an object displaying unit, configured to display an object stored in a directory of a computer and whose object attribute parameter meets the filter condition around the moved filter block in the plane coordinate system formed by the first axis and the second axis, by
      using a preset first transparency parameter, wherein the shorter the distance between the object and the moved filter block is, the smaller the first transparency parameter of the object is, or
      using a preset object size parameter, wherein the shorter the distance between the object and the moved filter block is, the lamer the object size parameter of the object is,
      to thereby filter which objects stored in the directory will be displayed.

6. The terminal device according to claim 5, wherein the object displaying unit is configured to:
   display, according to at least one of an object access status, a preset object access priority level, and a degree of matching between the object attribute parameter and the filter condition, an object whose object attribute parameter meets the filter condition around the moved filter block.

7. The terminal device according to claim 5, wherein the plane coordinate system formed by the first axis and the second axis specifically comprises:
   a rectangular coordinate system or a polar coordinate system formed by the first axis and the second axis.

8. The terminal device according to claim 5, wherein the filter block is displayed in a plane coordinate system formed by the first axis and the second axis by:
   displaying, by using a preset second transparency parameter, the filter block in the plane coordinate system formed by the first axis and the second axis.

9. An apparatus, comprising:
   a terminal device configured
      to move a filter block according to a received instruction,
      to obtain a first coordinate value of a first axis and a second coordinate value of a second axis corresponding to a center position of the moved filter block according to a position of the moved filter block, wherein the first coordinate value and the second coordinate value corresponding to an object attribute parameter respectively,
to display the filter block in a plane coordinate system formed by the first axis and the second axis, to obtain a filter condition according to the object attribute parameter corresponding to the first coordinate value and the object attribute parameter corresponding to the second coordinate value, and
to display an object stored in a directory of a computer and whose object attribute parameter meets the filter condition around the moved filter block in the plane coordinate system formed by the first axis and the second axis, by
using a preset first transparency parameter, wherein the shorter the distance between the object and the moved filter block is, the smaller the first transparency parameter of the object is, or
using a preset object size parameter, wherein the shorter the distance between the object and the moved filter block is, the lamer the object size parameter of the object is,
to thereby filter which objects stored in the directory will be displayed.

10. A method comprising:
moving a filter block according to a received instruction for moving the filter block, and obtaining a first coordinate value of a first axis and a second coordinate value of a second axis corresponding to a position of the moved filter block, wherein the filter block is displayed in a plane coordinate system formed by the first axis and the second axis, wherein the coordinate value on the first axis and the coordinate value on the second axis each correspond to an object attribute parameter respectively;
obtaining a filter condition according to the object attribute parameter corresponding to the first coordinate value and the object attribute parameter corresponding to the second coordinate value; and
displaying an object stored in a directory of a computer and whose object attribute parameter meets the filter condition around the moved filter block in the plane coordinate system formed by the first axis and the second axis, by
using a preset first transparency parameter, wherein the shorter the distance between the object and the moved filter block is, the smaller the first transparency parameter of the object is, or
using a preset object size parameter, wherein the shorter the distance between the object and the moved filter block is, the larger the object size parameter of the object is,
to thereby filter which objects stored in the directory will be displayed.

11. The method according to claim 10, wherein the displaying an object whose object attribute parameter meets the filter condition in the plane coordinate system formed by the first axis and the second axis specifically comprises:
displaying, according to at least one of an object access status, a preset object access priority level, and a degree of matching between the object attribute parameter and the filter condition, an object whose object attribute parameter meets the filter condition around the moved filter block.

* * * * *

UNITED STATES PATENT AND TRADEMARK OFFICE
CERTIFICATE OF CORRECTION

PATENT NO.         : 9,013,508 B2
APPLICATION NO.    : 14/019919
DATED              : April 21, 2015
INVENTOR(S)        : Jun Liang et al.

It is certified that error appears in the above-identified patent and that said Letters Patent is hereby corrected as shown below:

In the Claims,

Claim 5, Column 8, Line 38:

Delete "lamer" and insert --larger--, therefor.

Claim 9, Column 9, Line 22:

Delete "lamer" and insert --larger--, therefor.

Signed and Sealed this
Thirtieth Day of June, 2015

Michelle K. Lee
*Director of the United States Patent and Trademark Office*